United States Patent [19]

Robertson

[11] Patent Number: 4,483,401
[45] Date of Patent: Nov. 20, 1984

[54] TRASH CLEARING ASSEMBLY FOR FARM IMPLEMENTS

[75] Inventor: Forrest E. Robertson, Garden City, Kans.

[73] Assignee: Acra-Plant, Inc., Garden City, Kans.

[21] Appl. No.: 429,799

[22] Filed: Sep. 30, 1982

[51] Int. Cl.³ ............................................. A01C 5/06
[52] U.S. Cl. ................................... 172/574; 172/184; 172/744; 172/774
[58] Field of Search ............... 172/574, 538, 603, 575, 172/184, 187, 575, 510, 185, 774, 186, 180, 181, 151, 166, 606, 763, 762; 111/81, 86, 87, 88

[56] References Cited

U.S. PATENT DOCUMENTS

| T862011 | 5/1969 | Koronka | 111/88 |
| 448,349 | 3/1892 | King | 172/187 |
| 588,787 | 8/1897 | Atkins | 172/574 |
| 642,273 | 1/1900 | White | 172/575 |
| 710,303 | 9/1902 | Rentsch | 172/574 |
| 736,963 | 8/1903 | Ham | 172/575 |
| 1,169,183 | 1/1916 | Orndoff | 172/574 |
| 1,500,367 | 7/1924 | Caughey | 172/574 |
| 2,486,442 | 11/1949 | Silver | 172/187 |
| 2,659,291 | 11/1953 | Tanke | 172/603 |
| 2,734,439 | 2/1956 | Padrick | 172/184 |
| 2,757,593 | 8/1956 | Bowman | 172/603 |
| 3,362,361 | 1/1968 | Morrison | 111/73 |
| 3,642,333 | 2/1972 | Eisenhardt | 172/763 |
| 3,718,191 | 2/1973 | Williams | 172/603 |
| 4,295,532 | 10/1981 | Williams et al. | 172/574 |

FOREIGN PATENT DOCUMENTS

| 2445682 | 9/1980 | France | 172/574 |
| 301207 | 11/1928 | United Kingdom | 172/574 |
| 913496 | 3/1960 | United Kingdom . | |

Primary Examiner—Richard J. Johnson
Attorney, Agent, or Firm—Schmidt, Johnson, Hovey & Williams

[57] ABSTRACT

A double disc attachment for farm implements operating to present a debris-cleared area ahead of the furrow opener of the implement, has a peripherally notched disc with one of the discs spaced from and leading the other. Each disc is rotatably carried by its own independent, rearwardly-extending bracket, and each bracket has its own independent, vertically extensible support, with the supports and the brackets laterally spaced. In two embodiments the supports are disposed entirely behind the discs, and in all forms each support is adjustably secured to its own independent means for separate mounting of its disc unit on the implement. The mounts are also laterally spaced, and in one form the discs are located between the brackets.

11 Claims, 12 Drawing Figures

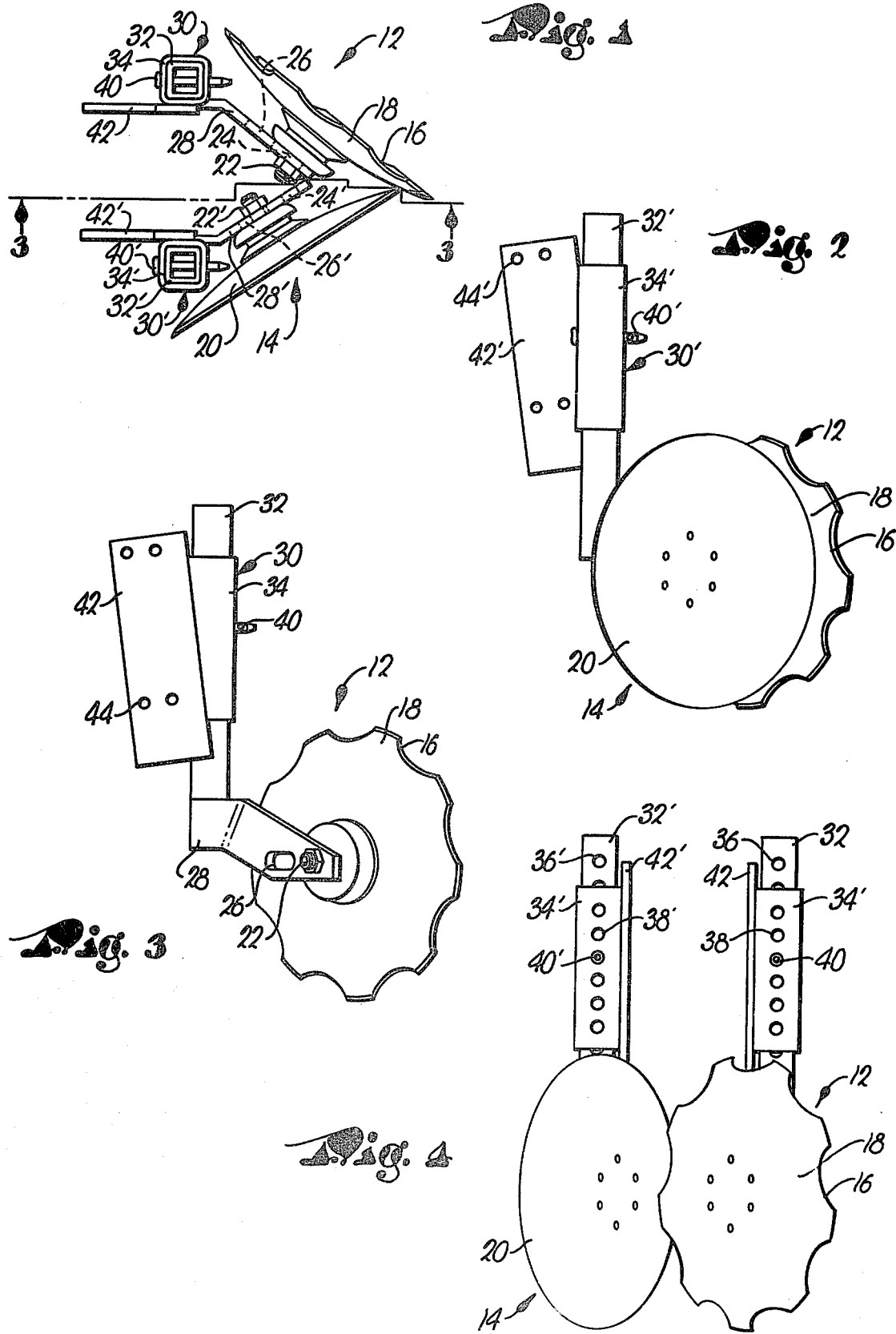

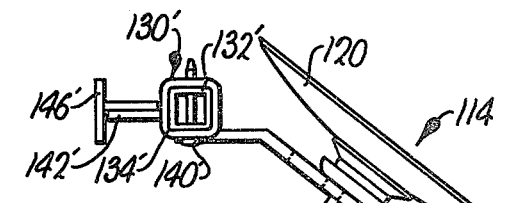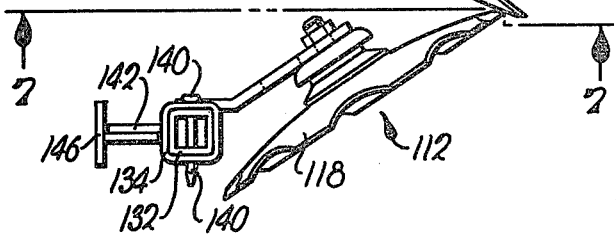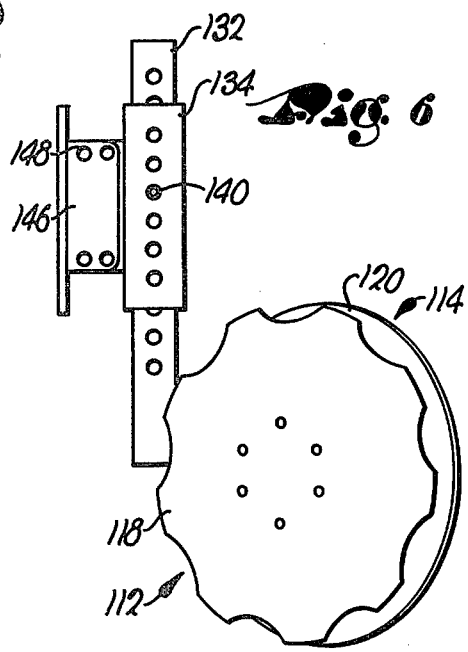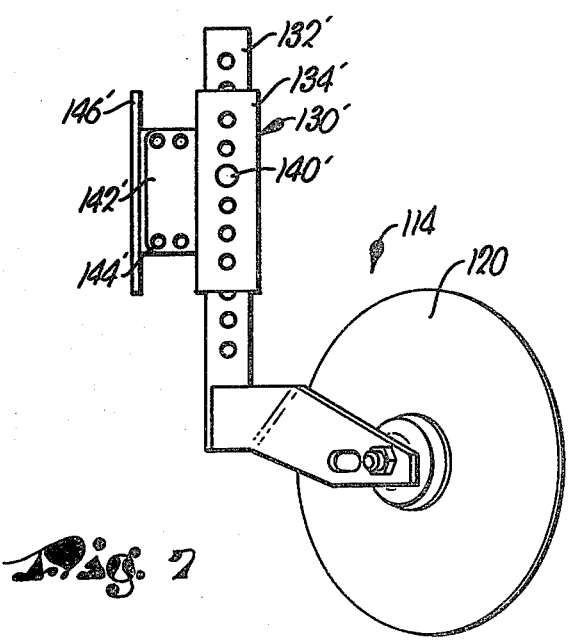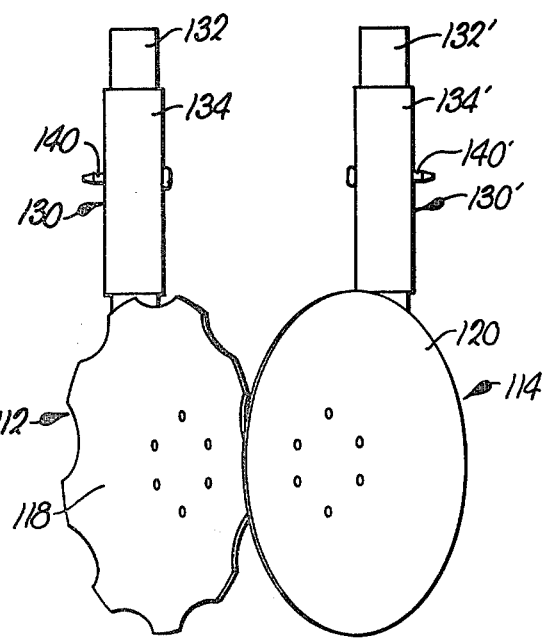

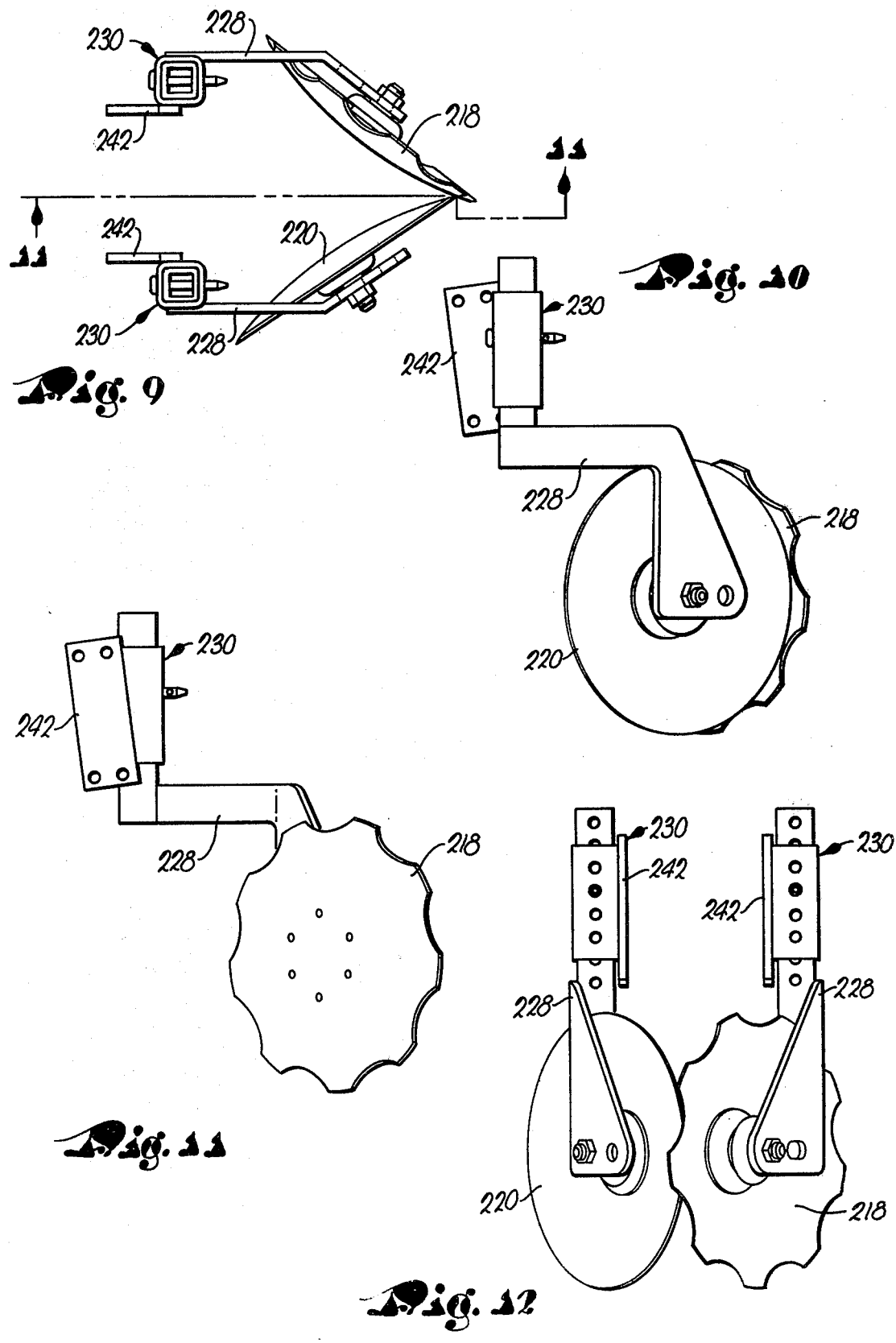

TRASH CLEARING ASSEMBLY FOR FARM IMPLEMENTS

The present invention relates to improvements in the trash clearing attachment of U.S. Pat. No. 4,295,532 dated Oct. 20, 1982. While the unit disclosed in such patent has been highly successful commercially, requiring no major changes in cost reduction, improved operation or better results, I have found a need or desirability for modifications which will increase versatility and better adapt the device more universally for all kinds of trash and soil types and conditions, and to permit its use on a wider range of farm implements.

Accordingly, as distinguished from the concepts of said patent, wherein the brackets upon which the discs are rotatably mounted have a common support, I have provided two separate disc assemblies such that each has its own, individual attachment to the implement and each is capable of being adjusted to suit all needs and conditions completely independent of the adjustments made to the other.

As a result of such separation to avoid the unitary construction we disclosed in the patent above identified, I am now able to increase the extent to which the attitudes of the discs may be varied not only with respect to each other but with respect to the ground and the path of travel of the implement, vertically, horizontally and angularly.

In the drawings:

FIG. 1 is a top plan view of a trash clearing attachment for farm implements made according to one embodiment of my present invention;

FIG. 2 is a side elevational view thereof;

FIG. 3 is a cross-sectional view taken on line 3—3 of FIG. 1;

FIG. 4 is a front elevational view of the attachment shown in FIGS. 1-3;

FIG. 5 is a top plan view of a second embodiment of the instant invention;

FIG. 6 is a side elevational view thereof;

FIG. 7 is a cross-sectional view taken on line 7—7 of FIG. 5;

FIG. 8 is a front elevational view of the attachment shown in FIGS. 5-7;

FIG. 9 is a top plan view of a third embodiment of my present invention;

FIG. 10 is a side elevational view thereof;

FIG. 11 is a cross-sectional view taken on line 11—11 of FIG. 9; and

FIG. 12 is a front elevational view of the attachment shown in FIGS. 9-11.

In the embodiment of FIGS. 1-4 of the drawings a pair of laterally spaced units 12 and 14 are identical in nature except only for the provision of notches 16 in a circular, concavo-convex disc 18 for the unit 12, whereas a circular, concavo-convex disc 20 for the unit 14 is also peripherally sharpened but unnotched. Therefore, only unit 12 will be described, the same reference numerals, suitably primed, being applied to like parts of the unit 14.

The rotatable disc 18 has a nut and axle fastener 22 received either by a front hole 24 or a rear, essentially horizontal slot 26 in a generally L-shaped bracket 28 extending rearwardly from the fastener 22 along the inner, convex face of the disc 18. An upright support 30 has an inner tube 32 telescoped within an outer tube 34, a series of openings 36 and 38 being provided in tubes 32 and 34 respectively for receiving a fore and aft pin 40. The bracket 28 is rigidly secured to the tube 32 below the tube 34.

A mounting plate 42, rigidly secured to the inner face of the tube 34, has a plurality of apertures 44 for permitting attachment, by use of bolts or the like (not shown), of the unit 12 to farm implements, such as planters, in connection with which the unit 12 is to be used.

Noteworthy is the entire separation of the units 12 and 14 in laterally spaced relationship throughout, fore to aft, with the disc 18 in leading relationship to the disc 20, and with both discs overlapping the centerline path of travel of the assembly. Either the right hand disc or the left hand disc may be the leading disc. In certain instances the unnotched disc might be the leading disc.

Inasmuch as four apertures 44 are provided in the plate 42, it is possible to select any one of four different tilted positions of each unit 12 and 14. First, the two rear apertures 44 may be used; secondly, the two front apertures 44 may be employed; thirdly, one may attach by use of the top rear and the bottom front apertures 44; and finally, still another attitude may be chosen, using the top front and the bottom rear apertures 44.

In the embodiment of FIGS. 5-8 both discs overlap the centerline path of travel of the assembly and unnotched disc 120 is shown in leading relationship to notched disc 118. Moreover, the discs are separately rotatable, as in FIGS. 1-4, and the peripheral margin of the inner convex face of the disc 118 has minimal spacing from the inner convex face of the disc 120 just above the ground level such that the discs 118 and 120 rotate by ground engagement. All components of the two units 112 and 114 are separate and laterally spaced as in the units 12 and 14 of FIGS. 1-4.

As distinguished from the units 12 and 14, pins 140 extend laterally through tubes 132 and 134 of supports 130. Further, plates 142 extend rearwardly from the rear faces of the tubes 134 and apertures 144 are used to receive fasteners which connect T-shaped mounting elements 146 with the plates 142, the elements 146 having corresponding apertures 148.

The embodiment of FIGS. 9-12 has discs 218 and 220 arranged as in FIGS. 5-8 with the disc 218 leading and with both discs overlapping the centerline of travel as in FIGS. 1-4. All other components are essentially the same as in FIGS. 1-4 except that the discs 218 and 220 are disposed between brackets 228. Significant also is the fact that supports 230 are entirely behind the discs 218 and 220 as in FIGS. 5-8.

In all three embodiments, therefore, the discs may be moved fore and aft relative to their brackets, separately or together. In each form also, through use of their extensible, telescoping supports, the heights of each disc may be varied, even permitting variances in such heights between the discs.

In the embodiment of FIGS. 1-4 the plates 42 and 42' are particularly adapted for connection with four point, parallel lift linkage of farm implements through use of the four apertures 44 and 44'. Depending upon which of such apertures are employed, the supports 30 and 30' may be tilted forwardly or rearwardly from the vertical positions illustrated. This, of course, changes the angle of attack of the discs 18 and 20. The same is true of plates 242 of FIGS. 8-12.

On the other hand, the elements 146 in FIGS. 5-8 may be rigidly attached to the implement and the tilting effected by varying the connections between the plates 142 and the mounting elements 146 through use of fasteners passing through selected apertures 144 and 148.

While the discs in all embodiments are ground driven, it is contemplated that, within the concepts of my invention, either or both discs may be motor driven.

I claim:

1. In a farm implement, a pair of independent units for clearing trash ahead of the implement and laterally in opposite directions, each unit comprising:
    a ground-engageable disc having a sharpened, circular periphery, a convex inner surface and an opposed, outwardly facing concave surface;
    an elongated bracket having a forward and a rear end;
    an axle mounting the disc on the bracket at its forward end for rotation about the central axis of disc, said axis being disposed at an angle with respect to the path of travel of the implement, the bracket extending rearwardly from said axle;
    an elongated, normally vertical support rigidly secured at its lowermost end directly to the bracket at the rear end of the bracket rearwardly of the axle and extending upwardly from the bracket; and
    a mount on the support having means for releasably attaching the same to the implement,
    said discs diverging as the supports are approached with one disc leading the other disc, said brackets, axles, supports and mounts being laterally spaced and disposed above the level of said ground rendering the units separately removable from the implement upon detachment of said releasable means.

2. The invention of claim 1, each support being extensible for varying the depth of ground penetration by its disc.

3. The invention of claim 1, each unit having means for swinging its bracket up and down.

4. The invention of claim 1, the leading disc being peripherally notched.

5. The invention of claim 1, each bracket having a number of axle-receiving openings for varying the angularities of the discs and their relative positions.

6. The invention of claim 1, the brackets being disposed between the discs.

7. The invention of claim 1, the discs being disposed between the brackets.

8. The invention of claim 1, the discs being laterally spaced.

9. The invention of claim 1, said other disc being spaced from the leading disc at the zone of convergence of the discs.

10. The invention of claim 1, the supports being disposed between the discs.

11. The invention of claim 1, the discs being disposed forwardly of the supports.

* * * * *